(12) United States Patent
Trottmann (10) Patent No.: US 10,890,193 B2
(45) Date of Patent: Jan. 12, 2021

(54) MULTIPHASE PUMP

(71) Applicant: Sulzer Management AG, Winterthur (CH)

(72) Inventor: Benedikt Trottmann, St. Gallen (CH)

(73) Assignee: SULZER MANAGEMENT AG, Winterthur (CH)

( * ) Notice: Subject to any disclaimer, the term of this patent is extended or adjusted under 35 U.S.C. 154(b) by 234 days.

(21) Appl. No.: 15/954,058

(22) Filed: Apr. 16, 2018

(65) Prior Publication Data

US 2018/0231013 A1  Aug. 16, 2018

Related U.S. Application Data

(63) Continuation of application No. 14/650,150, filed as application No. PCT/EP2013/074954 on Nov. 28, 2013, now Pat. No. 10,066,635.

(30) Foreign Application Priority Data

Dec. 20, 2012  (EP) .................................. 12198498

(51) Int. Cl.
*F04D 29/06* (2006.01)
*E21B 43/38* (2006.01)
(Continued)

(52) U.S. Cl.
CPC ......... *F04D 29/06* (2013.01); *B01D 19/0052* (2013.01); *B01D 21/26* (2013.01); *B01D 21/262* (2013.01); *B01D 21/265* (2013.01); *B01D 29/00* (2013.01); *B04B 5/10* (2013.01); *E21B 43/128* (2013.01); *E21B 43/38* (2013.01); *F04D 1/00* (2013.01); *F04D 9/003* (2013.01); *F04D 13/0606* (2013.01); *F04D 13/086* (2013.01); *F04D 17/08* (2013.01); *F04D 29/061* (2013.01); *F04D 29/588* (2013.01); *F04D 31/00* (2013.01)

(58) Field of Classification Search
CPC .... F04D 13/086; F04D 13/0606; F04D 17/08; F04D 29/06; F04D 1/00; F04D 9/003; F04D 29/061; F04D 29/588; F04D 31/00; E21B 43/128; E21B 43/34; E21B 43/38; B01D 19/0052; B01D 21/26; B01D 21/262; B01D 21/265; B01D 29/00
USPC .................................. 417/2; 210/512.1, 787
See application file for complete search history.

(56) References Cited

U.S. PATENT DOCUMENTS

| 3,975,123 A | 8/1976 | Schibbye |
| RE30,836 E | 12/1981 | Bunnelle |

(Continued)

FOREIGN PATENT DOCUMENTS

| CN | 1033862 A | 7/1989 |
| CN | 2102399 U | 4/1992 |
| GB | 410322 A | 5/1934 |

*Primary Examiner* — Patrick Hamo
(74) *Attorney, Agent, or Firm* — Global IP Counselors, LLP (57) ABSTRACT

A multiphase pump for pumping a multiphase mixture containing hydrocarbon includes a separation system and a supply system. The separation system has a first separation stage configured to at least partly separate at least one portion of the multiphase mixture into a plurality of phase-enriched components, the first separating stage including an impeller attached to a pump shaft of the multiphase pump and being having an inlet side formed by a seal. The supply system is configured to supply a liquid-enriched liquid component as a lubricant to a pump element to be lubricated.

16 Claims, 8 Drawing Sheets

(51) Int. Cl.

| | |
|---|---|
| *B01D 19/00* | (2006.01) |
| *E21B 43/12* | (2006.01) |
| *F04D 13/06* | (2006.01) |
| *F04D 13/08* | (2006.01) |
| *F04D 29/58* | (2006.01) |
| *F04D 31/00* | (2006.01) |
| *F04D 9/00* | (2006.01) |
| *B01D 21/26* | (2006.01) |
| *B04B 5/10* | (2006.01) |
| *B01D 29/00* | (2006.01) |
| *F04D 1/00* | (2006.01) |
| *F04D 17/08* | (2006.01) |

(56) References Cited

U.S. PATENT DOCUMENTS

| | | |
|---|---|---|
| 4,375,156 A | 3/1983 | Shaw |
| 4,913,630 A | 4/1990 | Cotherman et al. |
| 4,940,401 A | 7/1990 | White, Jr. |
| 5,083,909 A | 1/1992 | Kunsemiller |
| 5,525,146 A | 6/1996 | Straub |
| 6,457,950 B1 | 10/2002 | Cooper |
| 6,644,942 B2 | 11/2003 | Rival |
| 2003/0196802 A1 | 10/2003 | Proctor |
| 2011/0052432 A1 | 3/2011 | Cunningham |

MULTIPHASE PUMP

CROSS-REFERENCE TO RELATED APPLICATIONS

This application is a continuation of U.S. application Ser. No. 14/650,150, filed Jun. 5, 2015, which is a U.S. National stage application of International Application No. PCT/EP2013/074954, filed Nov. 28, 2013, which claims priority to EP Patent Application 12198498.3, filed Dec. 20, 2012, the contents of each of which are hereby incorporated herein by reference.

BACKGROUND

Field of the Invention

The invention relates to a multiphase pump for pumping a multiphase mixture containing hydrocarbon.

Background Information

Fossil fuels are not present in pure form in oil fields or gas fields, but as a multiphase mixture which contains liquid components, gas components and possibly also solid components. This multiphase mixture of crude oil, natural gas and chemicals; seawater and a not unsubstantial proportion of sand are possibly also present; is pumped from the oil field or gas field using pumps and is transported onward. On such a conveying of fossil fuels, multiphase pumps are used which are able to pump a liquid-gas mixture which may also contain solid components, sand for example. Such multiphase pumps are designed as high-pressure pumps to be able to convey the conveyed product, also vertically, over a long distance. This in particular applies with underwater pumps for conveying raw materials from underwater fields.

Particularly with pumps which are difficult to access, such as pumps on the seabed, it is advantageous if the cooling and lubrication can take place with low maintenance and with few external circuits, for example for lubricants.

SUMMARY

It is an object of the invention to provide a multiphase pump which manages with as few circuits of special operating media as possible.

This object is satisfied by a multiphase pump of the initially named kind which, in accordance with the invention, has a separation system having a first separation stage for at least partly separating at least some of the multiphase mixture into a plurality of phase-enriched components. The individual phase-enriched components, in particular a liquid-enriched liquid component and/or a gas-enriched gas component, can be used for special operating work in the multiphase pump, for example a lubrication and/or cooling of a pump unit and/or of a motor unit.

In an advantageous embodiment, the multiphase pump includes a supply system for supplying a liquid-enriched liquid component as a lubricant to a pump unit to be lubricated. In this manner, a lubricant container and a lubricant circuit of an external lubricant can be dispensed with. In addition, seals for separating lubricant and pumped product at the high-pressure side and at the low-pressure side of the pump can be dispensed with.

The pump element to be lubricated can be a bearing of a motor unit and/or of a pump unit of the multiphase pump. The pump element is in particular lubricated only by the liquid-enriched liquid component. The liquid-enriched liquid component is a liquid component which contains hydrocarbon and whose liquid portion is higher than that of the multiphase mixture. The liquid portion in particular lies above 98% by weight, with a volume portion of the liquid of more than 70% being advantageous.

The separation system serves for separating a liquid-enriched liquid component from the multiphase mixture, in particular also for separating a gas-enriched gas component from the multiphase mixture, and further in particular for separating a solid component such as sand from the multiphase mixture, so that the liquid-enriched liquid component is at least substantially liberated from solids. A solid portion of up to 1% by weight, in particular up to 0.2% by weight, having a grain size larger than 100 μm, is still compatible in this respect and can be covered by the designation substantially free of solids.

The multiphase pump is expediently a high-pressure pump for pumping the multiphase mixture at a differential pressure of at least 10 bar. For example, the multiphase pump is an underwater pump, a top-side pump or another pump, in particular provided for a use beneath the water's surface, in particular down to a depth of 100 m, down to 500 m or even down to more than 1,000 m beneath the water's surface. The pump can be an oil-well pump which is prepared for the pumping of crude oil. In this respect, the multiphase mixture expediently contains petroleum or crude oil as the portion containing hydrocarbon. The multiphase mixture can furthermore contain methane, natural gas or another gaseous fuel.

The separation system includes a branch between a product inlet and a product outlet of the multiphase pump for separating the portion of the multiphase mixture. The branch can lie before or after a pump path, that is can be connected to high-pressure region or to a low-pressure region of the pump. In particular with an arrangement in the high-pressure range, the branch can be a partly permeable seal through which a portion of the pumped product, that is of the multiphase mixture, presses. To allow a backflow of separated components, in particular of a solid component and/or of a gas component, into the product passage between the product inlet and the product outlet, it is advantageous if the separation system is connected to the low-pressure side of the pump so that the component to be led off can be introduced there.

With an advantageous embodiment of the invention, the separation system has a second separation stage present in addition to the first separation stage for separating the liquid-enriched liquid component into a more highly enriched liquid component and a gas-enriched gas component. A further function of the separation stage is to prevent or at least suppress a mixing of the liquid component and the gas component. A more liquid pure liquid component can hereby be produced for a more effective lubrication process.

The first separation stage is advantageously provided to separate the solid portion at least substantially completely from the liquid-enriched liquid component. The gas portion does not have to be intensively separated from the liquid-enriched liquid component. The liquid-enriched liquid component can be separated in the second separation stage into a more highly enriched liquid component and a gas-enriched gas component and one or both components can be used individually. The liquid-enriched liquid component can thus be used for lubricating and/or cooling a pump element, for example one or more bearings of the pump unit or motor unit.

In a particularly advantageous embodiment of the invention, the gas-enriched gas component is likewise used, for example for cooling an element of the pump unit or motor unit. In this manner both the liquid component and the gas component can be used in an operation-promoting manner in the multiphase pump so that an effort for lubricating and/or cooling elements of the multiphase pump can be reduced.

The second separation stage of the separation system is advantageously arranged upstream of the pump element in the supply system. The liquid component is therefore conducted from the first separation stage via the second separation stage to the pump element. A gas component and/or solid component segregated in the first separation stage expediently does not reach the second separation stage so that a more highly enriched liquid component can be produced there. The second separation stage is advantageously arranged directly at the pump element to be lubricated, for example at a bearing of the pump unit or of the motor unit of the multiphase pump to be lubricated.

A reliable separation can be achieved within the second separation stage if it has a centrifuge with a rotating centrifugal element having an inwardly disposed gas passage and an outwardly disposed liquid passage. The liquid is centrifugally urged more outwardly than the gas due to the higher mass of inertia so that the gas and the liquid portion are separated.

The liquid passage of the centrifuge advantageously leads through a bearing for supporting the centrifugal element. The cooling and/or lubrication of the bearing can hereby be associated in a very compact manner with the separation in the second separation stage so that a compact, simple and reliable lubrication and/or cooling and separation can be achieved.

A central shaft of the multiphase pump is advantageously supported by the centrifugal element. The centrifugal element is rotated along by the pump shaft, whereby the centrifugal drive can be achieved particularly simply. A centrifugal separation can hereby be associated in a simple and compact manner with a shaft support.

A further advantageous aspect of the invention proposes that the supply system has a cooling unit, in particular in a circuit of a liquid-enriched liquid component. The liquid component can be cooled and can be used for cooling a pump element. The cooling unit is advantageously arranged between the first and second separation stages. The liquid-enriched liquid component obtained in the first separation stage can be cooled and can be conducted in cooled form to the pump element to be lubricated and/or cooled. This has the advantage that not only the liquid in the liquid-enriched liquid component, but also the gas portion remaining in the liquid components is cooled and can thus be used for cooling purposes. If the gas portion and the liquid portion are separated in the second separation stage, both components can accordingly be used at sites at which they are particularly advantageous. In this respect, it is as a rule the case that a gas flow takes place due to the rising gas through the total pump housing, starting from the first separation stage, so that gas as such is also available.

Pump elements can be cooled by a liquid component or by a gas component. Whereas the liquid component has the advantage of a higher cooling power, the gas component provides a lower friction associated with the cooling. It is thus advantageous to use the gas component for cooling when a liquid cooling would produce unwanted friction and would therefore be a disadvantage. It is advantageous in this respect if the multiphase pump has a gas supply from a gas output of the separation system to a heat-generating pump element. The gas outlet is advantageously a part of the second separation stage of the separation system, which brings about the advantage that the gas component separated in the first separation stage can be used for transporting away a solid portion.

In an aspect of the invention, the gas outlet is an outlet of a second separation stage for separating the liquid-enriched liquid component into a more highly enriched liquid component and a gas-enriched gas component. It is further advantageous if the gas component, which in particular emanates from the second separation stage, is used for cooling a pump element. For this purpose, the gas component has expediently previously flowed through a cooling unit, for example together with a liquid portion of the liquid component.

The multiphase pump has a pump motor in a motor unit for pumping. The motor unit expediently includes an outwardly disposed stator and an inwardly disposed rotor, wherein the outwardly disposed stator can be cooled by a coolant, for example by a dielectric fluid, so that a separate cooling circuit can be present. The cooling of the rotor is, however, difficult since a fluid connection to the rotor is very complex and/or expensive. A gas cooling is expedient for this.

Such a gas cooling can be achieved if the multiphase pump has a cooling gas path from a gas outlet of the separation system which conducts a gas-enriched gas component through a pump motor to cool the pump motor. A gas portion can thus be conducted from the first or second separation stage to the pump motor and can cool it there. A gas portion which was initially separated in the second separation stage and had in particular previously passed through a cooling unit is expediently conducted through the pump motor for its cooling. The gas-enriched gas component can thus, for example, be conducted between the rotor and the stator of the pump motor and can thus pass through a gap between the rotor and the stator. Since the rotor expediently has a pot which screens the outwardly disposed dielectric cooling liquid from the inwardly disposed rotor, that is it is a case of a so-called canned motor, the gap between the rotor and the stator can be very narrow, that is be configured with a small volume, so that the gas is guided in a compulsory manner along the total rotor and an effective cooling is made possible.

On a separation of the multiphase mixture or of the liquid-enriched liquid component in the second separation stage, it can hardly be prevented that the two separated components are somewhat heated by the separation. It is advantageous in this respect if the multiphase pump has a gas circuit for a gas-enriched gas component of the separation system which contains a cooling unit. The gas component can be cooled down and repeatedly conducted to the pump element to be cooled, for example to the rotor of the pump motor.

The invention is additionally directed to methods for operating a multiphase pump which pumps a multiphase mixture containing hydrocarbon.

In order to manage with as few circuits of special operating media as possible, it is proposed that in accordance with the invention a portion of the multiphase mixture is supplied to a first separation stage of a separation system of the multiphase pump'; the separation system separates the separated portion into at least one liquid-enriched liquid component and one gas-enriched gas component. One or both components can be used for lubricating and/or cooling a pump element and operating medium containers can correspondingly be omitted. If at least one pump element is lubricated or cooled by a portion of the multiphase mixture, the multiphase pump is a product-lubricated and/or product-cooled multiphase pump. A lubricant reservoir and above all seals between product spaces and lubricant spaces can e.g. be dispensed with and the pump can thus be kept compact.

To keep the wear of the multiphase pump small, it is advantageous if sand and other multiphase portions are removed from the multiphase mixture before a portion of the multiphase mixture is used for lubricating. For this purpose, a solid portion of the multiphase mixture is expediently separated in the first separation stage and the liquid-enriched liquid component is used at least substantially free of solids for lubrication. The liquid-enriched liquid component is expediently cooled and is used both for lubricating and for cooling a pump element.

A gas-enriched gas component which is usually returned to the product stream also arises on the separation of the multiphase mixture into a plurality of phase-different components. If, in contrast, at least some of the gas-enriched gas component is used for cooling a pump element, other cooling mechanisms can be dispensed with where possible and the pump can be kept simple.

It is furthermore proposed that a pump unit and/or motor unit of the multiphase pump is divided into at least one liquid-cooled region and at least one gas-cooled region and the liquid-enriched liquid component is supplied to the liquid-cooled region and the gas-enriched gas component is supplied to the gas-cooled region. In this manner, both components can be used profitably and the pump can be cooled effectively. The liquid-cooled region is expediently a region in which a high cooling power is the priority whereas the gas-cooled region is expediently a region which is cooled with as little friction as possible, for example a rotor of the pump motor or a coupling between the pump unit or motor unit of the multiphase pump.

In an aspect of the invention, the liquid component is divided into a more highly enriched liquid component and into a gas-enriched gas component in a second separation stage and the more highly enriched liquid component cools a pump element. To use a component to cool and/or to lubricate a pump element, the corresponding component should be as free of solids as possible. It is advantageous for this purpose if the multiphase pump has a first separation stage in which the solid portion is separated at least largely completely from the multiphase mixture and a second separation stage going beyond this is present to which at least one liquid-enriched liquid component from the first separation stage is supplied. It can be separated into a liquid component and a gas component in the second separation stage. Both components arising in the second separation stage can be used for lubrication or cooling without solid particles damaging the pump.

When both the gas component and the liquid component are used for lubricating and/or cooling, both components should be conducted separately from one another to avoid a renewed mixing as much as possible. In order, however, to avoid a plurality of separate component passages, it is advantageous if the liquid component and the gas component are conducted into a common space after the separation, from which space the liquid component is conducted off to the bottom and the gas component is conducted off to the top. In this embodiment of the invention, the different specific weights of the liquid component and the gas component are utilized to keep the previously separated components separate from one another even with a simple conducting in one common space. The gas rises upward and the liquid flows down so that the liquid can be conducted downwardly from the space and the gas can be conducted upwardly out of the space.

The previously presented description of advantageous aspects of the invention contains numerous features which are reproduced in the individual dependent claims; in some cases combined to a plurality thereof. However, the skilled person will expediently also observe these features individually and combine them to form sensible further combinations. These features can in particular respectively be combined individually and in any desired suitable combination with the method in accordance with the invention and the apparatus in accordance with the invention in accordance with the independent claims.

The above-described properties, features and advantages of this invention as well as the manner in which they are achieved will become clearer and more distinctly understandable in connection with the following description of the embodiments which will be explained in more detail in connection with the drawings. The embodiments serve for the explanation of the invention and do not restrict the invention to the combination of features given therein, also not with respect to functional features. In addition, for this purpose, suitable features of each embodiment can also be viewed explicitly in isolation, removed from an embodiment, can be introduced into another embodiment to complement it and/or can be combined with any desired one of the claims.

BRIEF DESCRIPTION OF THE DRAWINGS

Referring now to the attached drawings which form a part of this original disclosure.

DETAILED DESCRIPTION OF EMBODIMENTS

Figure 1:
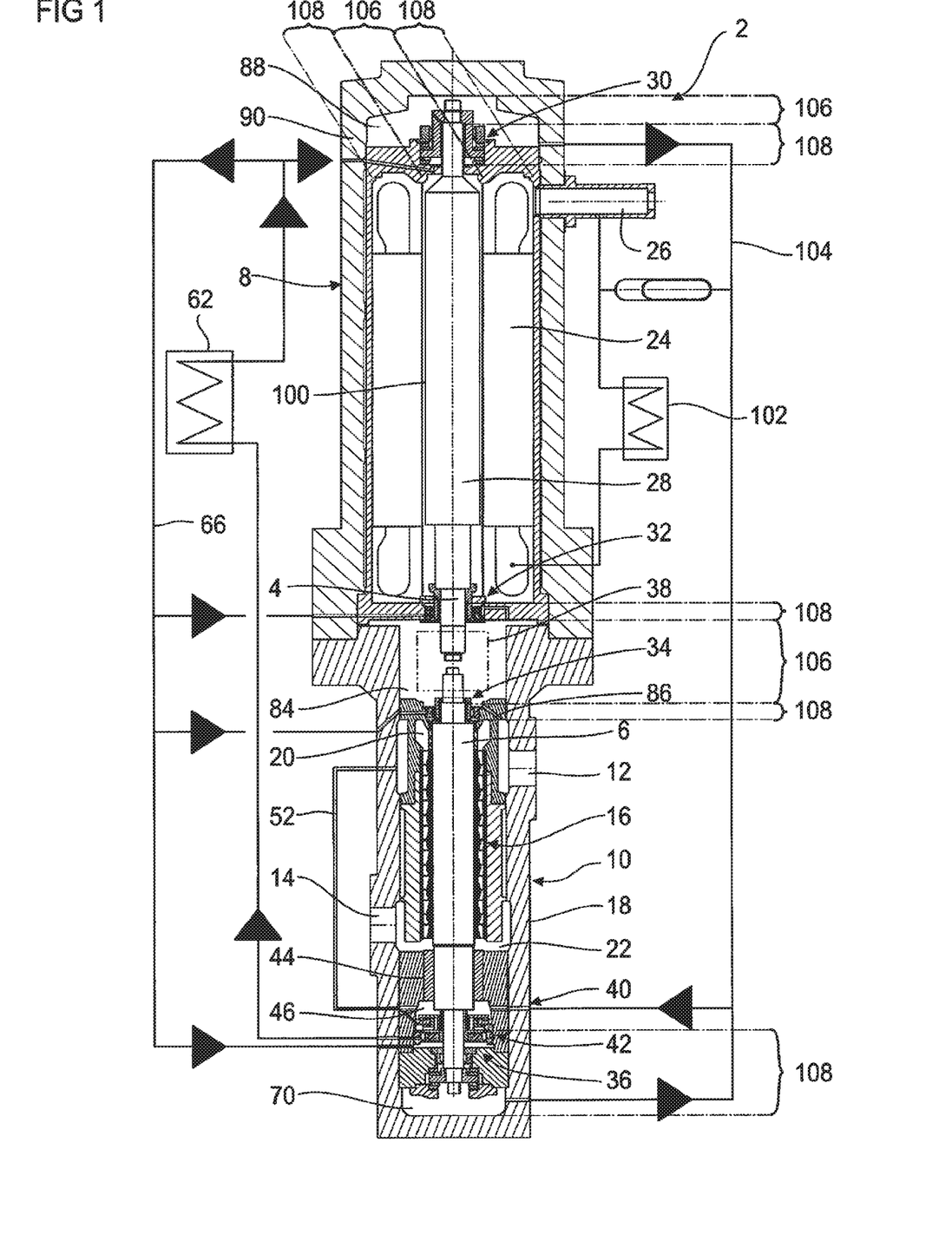
FIG. 1 is a sectional side representation of a multiphase pump with a vertical orientation and an upwardly disposed motor unit and a downwardly disposed pump unit.

FIG. 1 shows a multiphase pump 2 in a side sectional representation. The multiphase pump 2 can be a petroleum pump for underwater operation, for example on a seabed, and is in particular provided for use beneath the water's surface, in particular down to a depth of 100 m, down to 500 m or even down to more than 1,000 m beneath the water's surface. The multiphase pump 2 is provided for a vertical operation; its shaft, composed of a motor shaft 4 and a pump shaft 6, is therefore oriented vertically, that is in the direction of gravity, in operation. The multiphase pump 2 is manufactured for pumping a multiphase mixture which can include a liquid phase, a gaseous phase and a solid phase, wherein the liquid component can include heavy crude oil, seawater and chemicals, the gas component can include methane, natural gas or the like and the solid component can include sand, sludge and smaller stones without the multiphase pump 2 being damaged on the pumping of the multiphase mixture.

The multiphase pump 2 has a motor unit 8 and a pump unit 10. The pump unit 10 is provided with a product inlet 12 for sucking in the product to be pumped, that is the multiphase mixture, and with a product outlet 14 from which the pumped product is expelled again at a pressure increased with respect to the product inlet 12. A pump path 16 with rotating impellers and static diffusers is arranged between the product inlet 12 and the product outlet 14, with the rotating impellers being fastened to the pump shaft 6 and the diffusers being rigidly connected to a pump housing 18. The low-pressure side 20 which is of the same pressure as the product inlet 12 is arranged at the start of the pump path 16 and the high-pressure side 22 which is of the same pressure as the product outlet 14 is arranged at the end of the pump path 16. The pressure difference between the low-pressure side 20 and the high-pressure side 22 amounts to between 50 and 200 bar in regular operation.

The motor unit 8 is an electric motor unit with a stator 24 which is supplied with electrical energy via a power supply 26. During operation, the stator 24 drives a rotor 28 which forms the motor shaft 4 at its ends. The motor shaft 4 is supported in two bearings 30, 32 and the pump shaft 6 is likewise supported in two bearings 34, 36. The motor shaft 4 and the pump shaft 6 are rotationally fixedly connected to one another via a coupling 38 which is indicated by a chain-dotted box in FIG. 1.

During the operation of the multiphase pump 2, some of the pumped multiphase mixture is removed from the high-pressure side 22 and supplied to a separation system 40 with a first separation stage 42. The first stage 42 of the separation system 40 separates the multiphase mixture containing hydrocarbon into three components, a gas-enriched gas component, a liquid-enriched liquid component and a solid component which substantially includes the solid portion from the removed portion of the multiphase mixture. The action of the first separation stage 42 is described in the following in more detail with respect to the detailed representation of FIG. 2.

Figure 2:
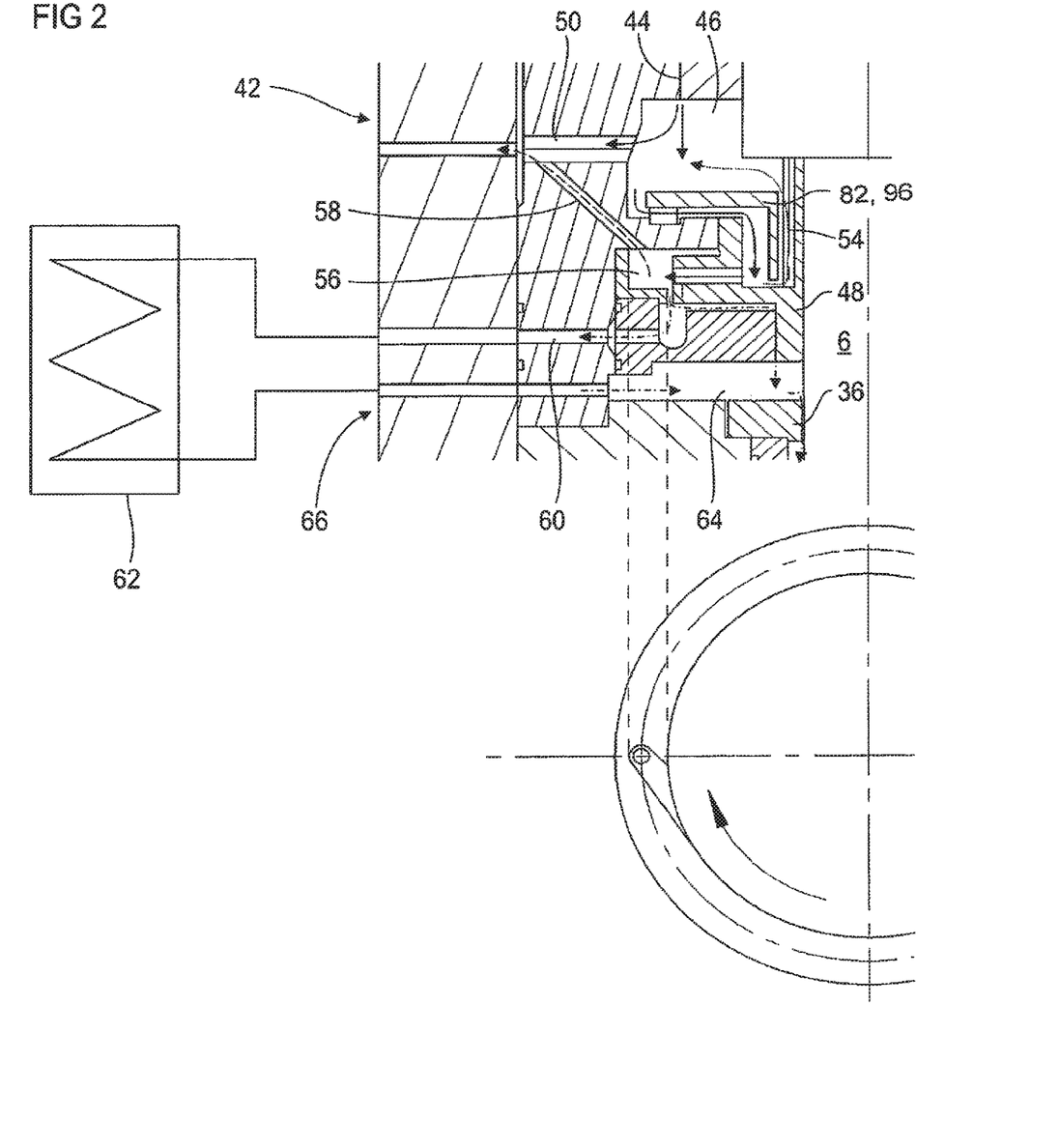
FIG. 2 is a sectional representation through a first separation stage of a separation unit of the multiphase pump from FIG. 1.

FIG. 2 shows the first separation stage 42 of the separation system 40 in an enlarged sectional side view. The inlet side of the first separation stage 42 is formed by a seal 44 which seals the high-pressure side 22 toward a low-pressure chamber 46 of the first separation stage 42. The seal does not, however, take place completely so that a small portion of the pumped multiphase mixture flows through the seal 44 and reaches the low-pressure chamber 46.

An impeller 48 is arranged at the lower end of the low-pressure chamber 46 and is fixedly connected to the pump shaft 6. The multiphase mixture arriving in the low-pressure chamber 46 is set into fast rotation by the rotating impeller 48.

A certain part of the multiphase mixture, however, flows around, but beneath the impeller 48, as is indicated by the solid arrow in FIG. 2. At the lower end of this passage, the multiphase mixture divides into a gas-enriched gas component (dotted arrow) and into the remainder of the multiphase mixture (solid arrow). Due to the mass of inertia, it is practically not possible for the solid portion and the liquid portion to rise radially inwardly via a gas passage 54 back into the low-pressure chamber 46, as is indicated by the dotted arrow in FIG. 2. The liquid and the solid are instead driven radially outwardly and thus reach a collection chamber 56 in which above all the solid portion of the multiphase mixture collects. It is again supplied to the removal passage 50 through a solid passage 58 and is thus channeled into the product stream via the connection line 52. The removal passage 50, which serves for relief, for example, is connected to the low-pressure side 20 of the pump unit 10 via a connection line 52 (FIG. 1) so that the removed multiphase mixture is again introduced into the product stream to be pumped.

A certain liquid portion, however, enters downwardly from the collection chamber 56 into a liquid passage 60 and is supplied via a cooler 62 to elements of the multiphase pump 2 to be lubricated and to be cooled. The liquid passage 60, cooler 62 and a supply space 64 are part of a supply system 66 for supplying a liquid-enriched liquid component to a plurality of pump elements as a lubricant and coolant. The cooler 62 is, for example, connected to surrounding seawater so that the heat from the cooler 62 is emitted into the surrounding seawater and a liquid component flowing through the cooler 62 is cooled accordingly.

As shown in FIG. 2, the liquid component cooled in the cooler 62 is urged into the supply space 64. The pressure force arises by the impeller 48 which urges the liquid component through the supply system 66. The liquid component there reaches one of the pump elements to be cooled and to be lubricated, namely the radial bearing 36 in which the pump shaft 6 is supported. The fluid component forces itself through a radial gap between the radial bearing 36 and the pump shaft 6 and lubricates the bearing 36 and cools it at the same time. The liquid component is collected in a collection space 70 (FIG. 1) which is located at the lower end of the pump housing 18; the liquid component is again supplied to the low-pressure chamber 46 so that it is available in a circuit again or is again introduced into the product stream through the removal passage 50.

FIG. 1 shows, beyond the example shown in FIG. 2, that the liquid component liquid-enriched in the first separation stage is not only supplied to the lower bearing 36 but also to the two motor bearings 30, 32 and the upper pump bearing 34. The supply to the upper pump bearing 34 is shown in FIG. 3.

Figure 3:
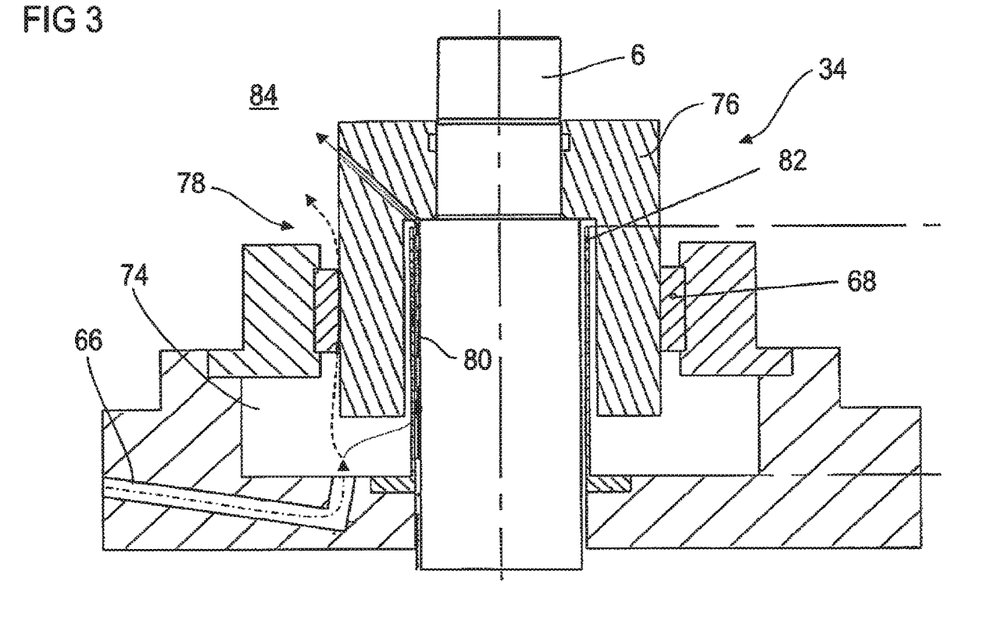
FIG. 3 is a sectional side view of a second separation stage of the separation system.

FIG. 3 shows the bearing 34 at the upper end of the pump shaft 6 to which the liquid component is guided by the supply system 66. The bearing 34 includes an impeller 76 which rotates with the pump shaft 6 and centrifuges the liquid component in the supply space 74. In so doing, the gas (dotted line) and the more highly enriched liquid (dashed line) are separated, whereby a second separation stage 78 is formed. A gas-enriched gas component flows through the radially inwardly disposed gas passage 80 in the impeller 76 and is there conducted through a labyrinth ring 82 into a space 84, with the labyrinth ring 82 acting like a pump and urging the gas component upwardly into the space 84. The outwardly hurled liquid component is urged through a gap between a bearing element 68 and the impeller 76 and lubricates it and also cools it since the temperature of the liquid component in the cooler 62 was significantly reduced. A further function of the separation stage is to prevent or at least suppress a mixing of the liquid component and the gas component.

The centrifugal element 76 supports the shaft 6 in the bearing 34 so that it satisfies both the centrifuge function of the second separation stage 78 and a support function for the pump shaft 6. The liquid component is correspondingly separated from the gas-enriched gas component by the centrifugal element 76 and cools exactly that element causing the separation on flowing through the bearing gap of the bearing 34.

In the further course, the cooling liquid component also reaches the space 84 in which, as is shown in FIG. 1, the coupling 38 between the motor shaft 4 and the pump shaft 6 is arranged. While the liquid component substantially does not reach the coupling 38, but is rather conducted off downwardly through a removal passage 86, the gas-enriched gas component rises upwardly in the space 84 and flows around the coupling 38. The coupling 38 is hereby cooled without its friction being significantly increased. The pump 2 makes use of the force of gravity here that the gas rises upward and the liquid component flows downward. A strictly separated gas and liquid guiding is hereby not necessary and the two components can be supplied to the space 84 together and nevertheless remain separate.

The liquid component flows through the removal passage 86 downwardly into the low-pressure side 20 and thus back into the product inlet 12 and is thus combined with the product stream to be pumped. The upwardly rising gas component rises upwardly through construction-induced cut-outs in the multiphase pump 2 and collects in an upper collection space 88 beneath the upper end of the motor housing 90.

Figure 4:
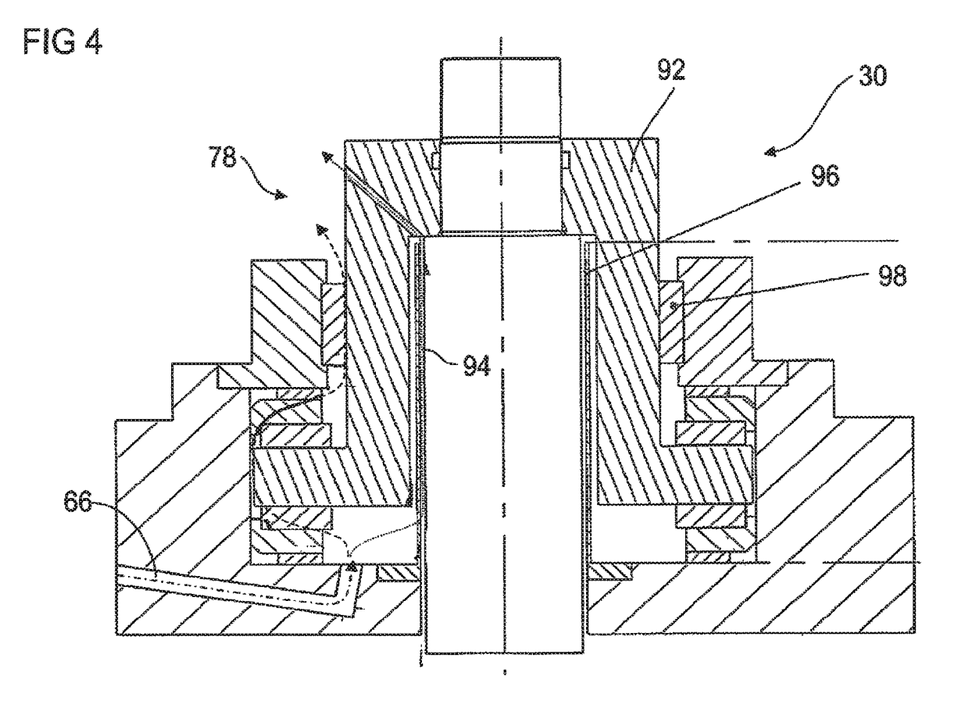
FIG. 4 is a further second separation stage of the separation system.

The liquid component which reaches the upper bearing 30 in the supply system 66 is treated in a very similar manner as described with reference to FIG. 3 and the bearing is shown in more detail in FIG. 4. A second separation stage 78 is also present here with a centrifugal element 92, a gas passage 94 and a labyrinth ring 96 for pumping the gas-enriched component upward, in this case into the collection space 88. The liquid component separated radially outwardly by the rotation of the centrifugal element 92 is again conducted through a bearing gap between the centrifugal element 92 and a bearing element 98 and thus cools the bearing 30 and additionally lubricates it. In addition, the shaft 6 is supported via the centrifugal element 92.

The bearing 32, whose detailed representation has been dispensed with here, is also treated in the same way. The bearing 32 also has a centrifugal element 92 and thus a second separation stage 78 in which—in the same way as in the bearing 30 and in the bearing 34—the liquid-enriched liquid component brought in by the supply system 66 is liberated from a gas portion and thus forms a more highly enriched liquid component. The more highly enriched liquid component cools the centrifugal element 92 and also the total bearing 32 and lubricates it at the same time.

The gas enriched gas component rises and reaches a ring gap 100 between the rotor 28 and the stator 24 of the motor unit 8. This ring gap 100 is closed radially outwardly by a pot so that the dielectric liquid which cools the stator 24 and is conducted through a cooler 102 in a cooling circuit cannot enter into the ring gap 100 and thus arrive at the rotor 28. The gas component rises upward in the ring gap 100 and flows about the total rotor 28 on which it exerts a cooling effect. This component also moves into the upper collection space 88 through intermediate spaces induced by the construction and is enriched there.

In the embodiment shown in FIG. 1, both the liquid component from the bearing 30 and the gas component from the upper collection space 88 is conducted back into the low-pressure chamber 46 in the manner of a circuit in a removal passage 104. It is alternatively possible to supply the gas-enriched gas component from the upper collection space 89 in a separate gas removal line to a gas cooler, to cool it there and to supply it in the further extent to a gas region of the multiphase pump 2 to be cooled. The gas cooler can, for example, be flowed around by seawater so that a cooling is simply reached.

As is indicated in FIG. 1, the multiphase pump 2 can be adjusted into gas regions 106 and liquid regions 108 which are arranged layered vertically above one another in the multiphase pump 2. The gas regions 106 are those regions to which the gas-enriched gas component is supplied, for example for cooling the coupling 38 or for cooling the rotor 28. The liquid regions 108 are those regions to which the liquid-enriched liquid component is supplied for cooling and for lubricating such as the upper motor bearing 30, the lower motor bearing 32, the upper pump bearing 34 and the lower pump bearing 36. Due to the separation of the multiphase mixture in the first separation stage 42 and thus the purifying of the solid portion from the solid portion, the liquid component which arises in this process can be supplied in purified form to the plurality of second separation stages 78 at the three upper bearings 30, 32, 34 for further separation into a liquid-enriched liquid component and a gas-enriched gas component. The liquid component arising in this process can be used for cooling and lubrication in the liquid regions 108, with the stator 24 being cooled separately by a dielectric fluid, for example. The gas component produced in the second separation stage can be supplied to the gas regions 106 for cooling without the cooling being associated with a high friction. The element in the gas region 106 is thus only cooled by the gas component and is kept free of the liquid component.

In summarizing words, internal components of the multiphase pump 2 such as the bearing 30, 32, 34, coupling 38 are cooled and lubricated by components of the pumped multiphase mixture. In this respect, the multiphase mixture is at least largely liberated from the solid portion in a first separation stage 42 and the purified enriched liquid component is used for cooling and lubrication. In this respect, however, this liquid component is again separated in one or more second separations stages 78 into a more highly enriched liquid component and a gas-enriched gas component, with both components being used for cooling pump elements. The gas component is supplied to at least one gas region in which the gas component has a cooling effect. The liquid component is supplied to at least one liquid region 108 which is different from the gas region 106 and in which the liquid component has a cooling and lubricating effect. In this manner, a plurality of components of the multiphase mixture can be used for cooling elements of the multiphase pump.

In this respect, the multiphase pump 2 is divided into a plurality of layers or regions 106, 108 arranged vertically above one another and the liquid component and the gas component are supplied to the respective associated gas region 106 or liquid region 108 for cooling. The separation and supply can in this respect take place driven by gravity so that the liquid sinks downward from a common space 84 and the gas component rises upward into the gas region 106.

While a basic variant of the invention is shown in the FIGS. 1 to 4, FIGS. 5 to 8 show alternative variants of individual components of the multiphase pump 2. The following descriptions is substantially restricted to the differences from the embodiment in FIGS. 1 to 4 to which reference is made with respect to features and functions which remain the same. Components which remain substantially the same are generally designated by the same reference numerals and non-mentioned features are taken over in the following embodiments without being described again in order not make the description unnecessarily long.

Figure 5:
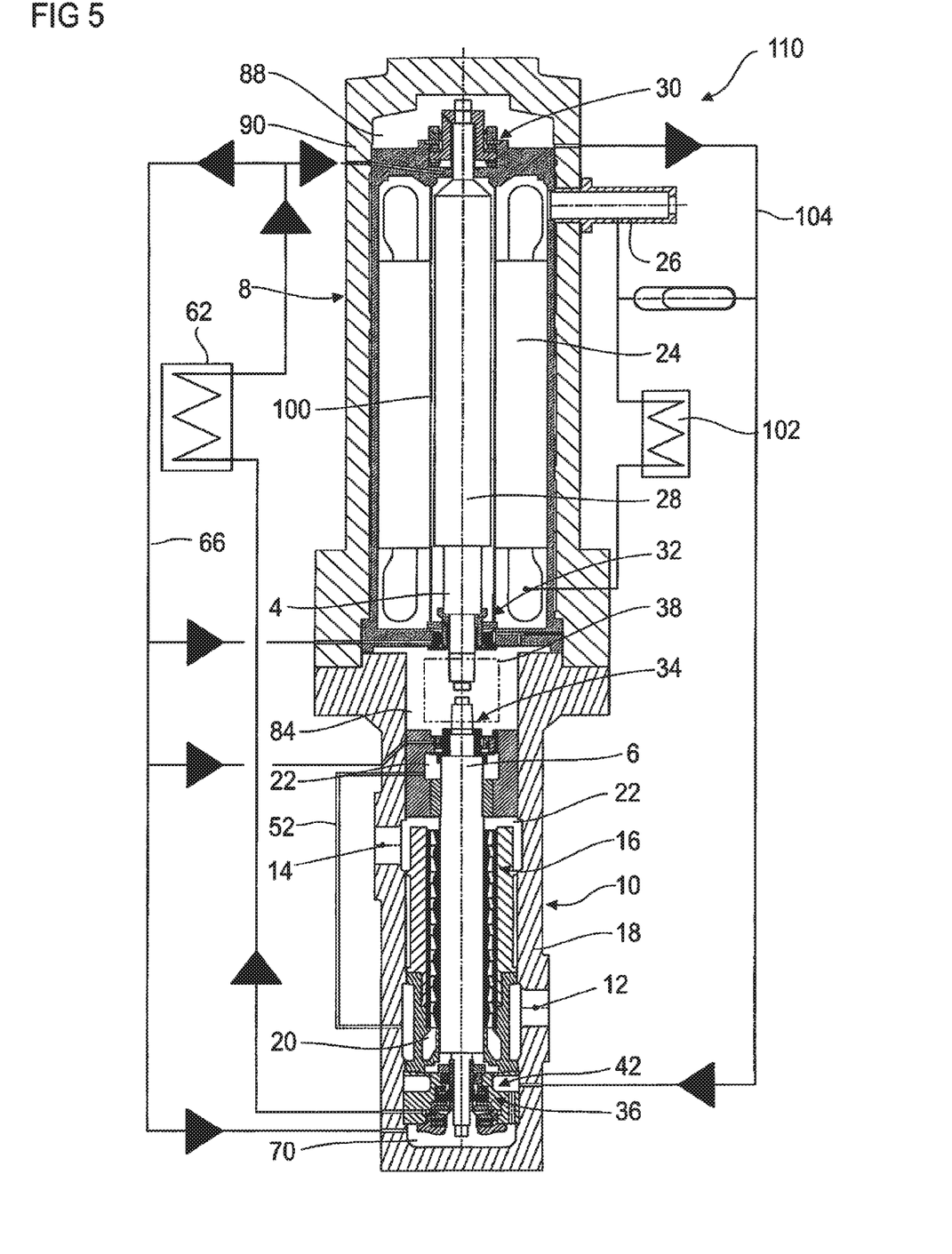
FIG. 5 is an alternative multiphase pump with a downwardly disposed product inlet and an upwardly disposed product outlet.

In the alternative shown in FIG. 5, the multiphase pump 110 has substantially the same design as the multiphase pump 2 of FIG. 1, but with the product inlet 12 being arranged lower than the product outlet 14. The part of the multiphase mixture which is used for cooling and lubricating the components is accordingly removed from the top of the pump unit 10 from the high-pressure side 22. The bearings 30, 32, 34, the coupling 38 and the rotor 28 are cooled as described above. The cooling of the lower pump bearing 36 is described with reference to FIG. 6A.

Figure 6A:
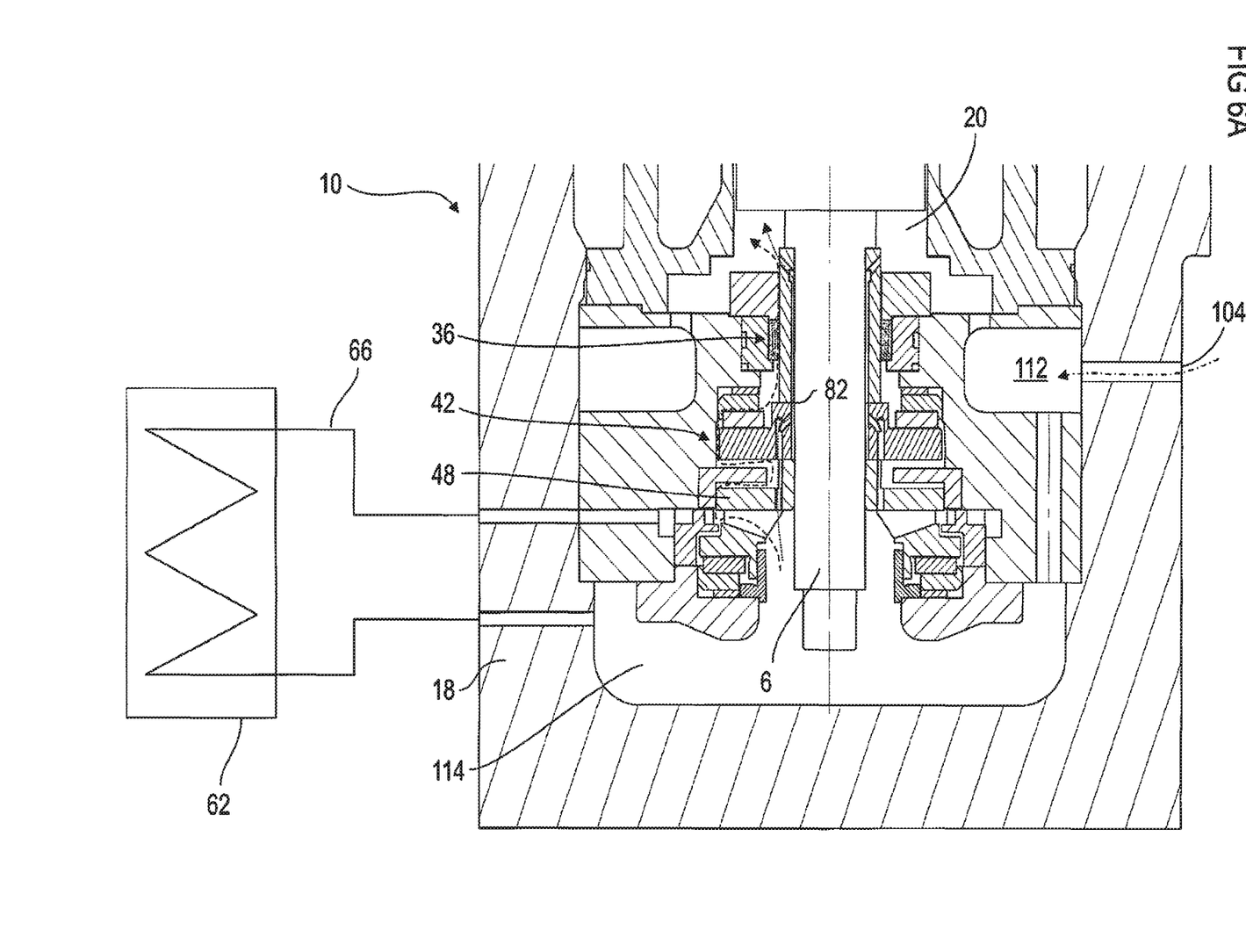
FIG. 6A is a first separation stage of the separation system of the multiphase pump of FIG. 5 in the lower region of the multiphase pump.
Figure 6B:
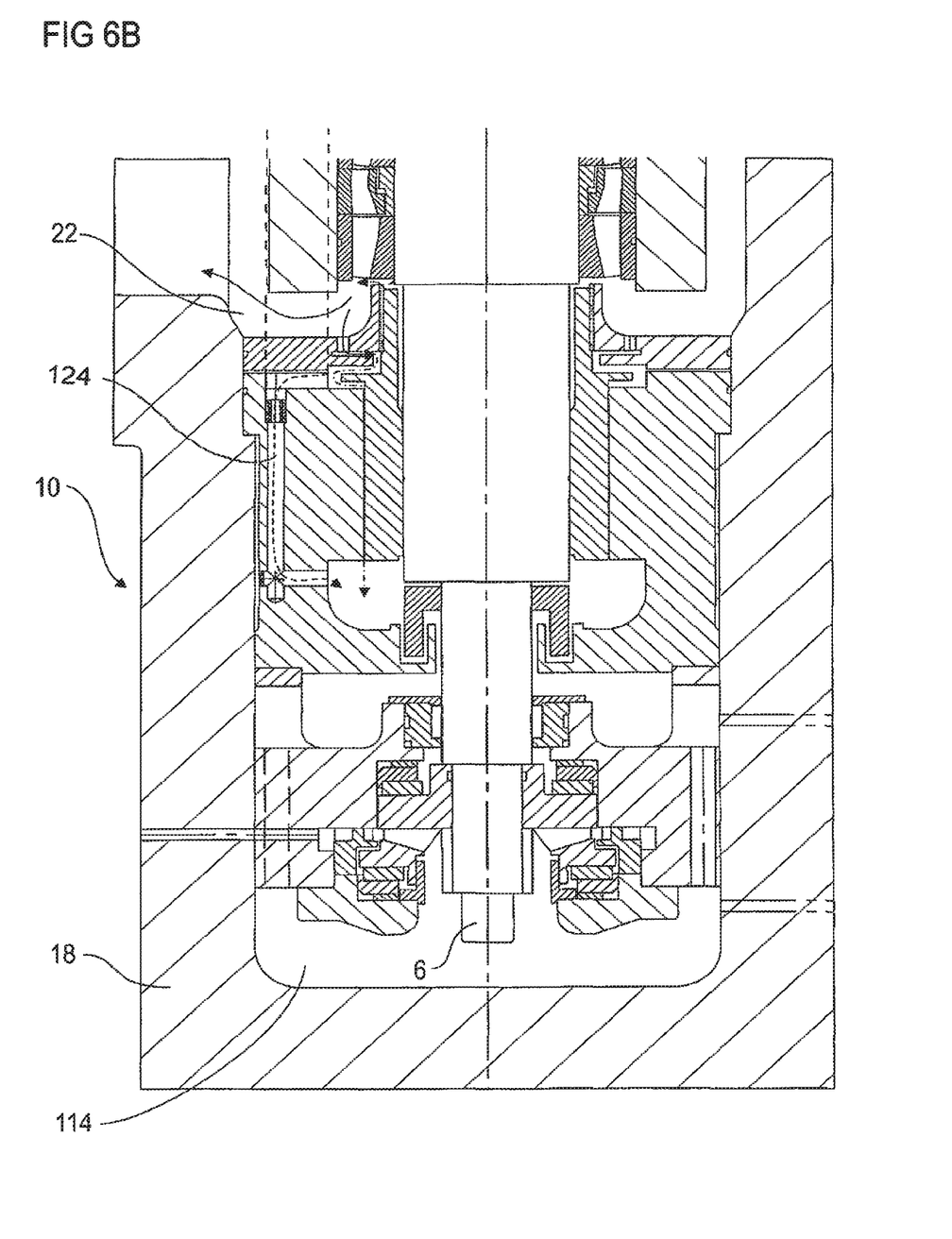
FIG. 6B is a separation stage of the separation system with sand removal.

FIG. 6A shows the lower region of the multiphase pump 110 with the bearing 36 in which the pump shaft 6 is downwardly supported. The supply of a prepurified liquid component takes place via the removal passage 104 into a collection space 112. It is connected to the low-pressure side 20 so that multiphase mixture can also flow into the collection chamber 112 or—depending on the pressure conditions—returned liquid component can returned into the low-pressure side 20 and thus into the product stream. A first separation stage 42 is formed by the impeller 48 through which separation stage the gas-enriched gas component (dotted line) is drawn radially inwardly and is thus separated from the liquid component which is conducted radially further outwardly (dashed line) and is urged through the bearing 36 and lubricates and cools it. However, the larger part of the liquid component is urged radially outwardly and conducted through the cooler 62, is cooled there and is conducted back into the lower collection space 114. A cooled liquid component is therefore present there so that the bearing 36 can be cooled. If a sand removal is not provided, as shown in FIG. 6A, the pressure relationships should be such that an excess pressure is present in the collection chambers 112, 114 where possible so that where possible only purified liquid component—with a still present gas portion—is present and no solid component enters into the supply system 66 and damages the bearings 30, 32, 34, 36. In addition, in accordance with FIG. 6B, an additional sand removal 124 is provided, with this not being necessary, however.

Figure 7:
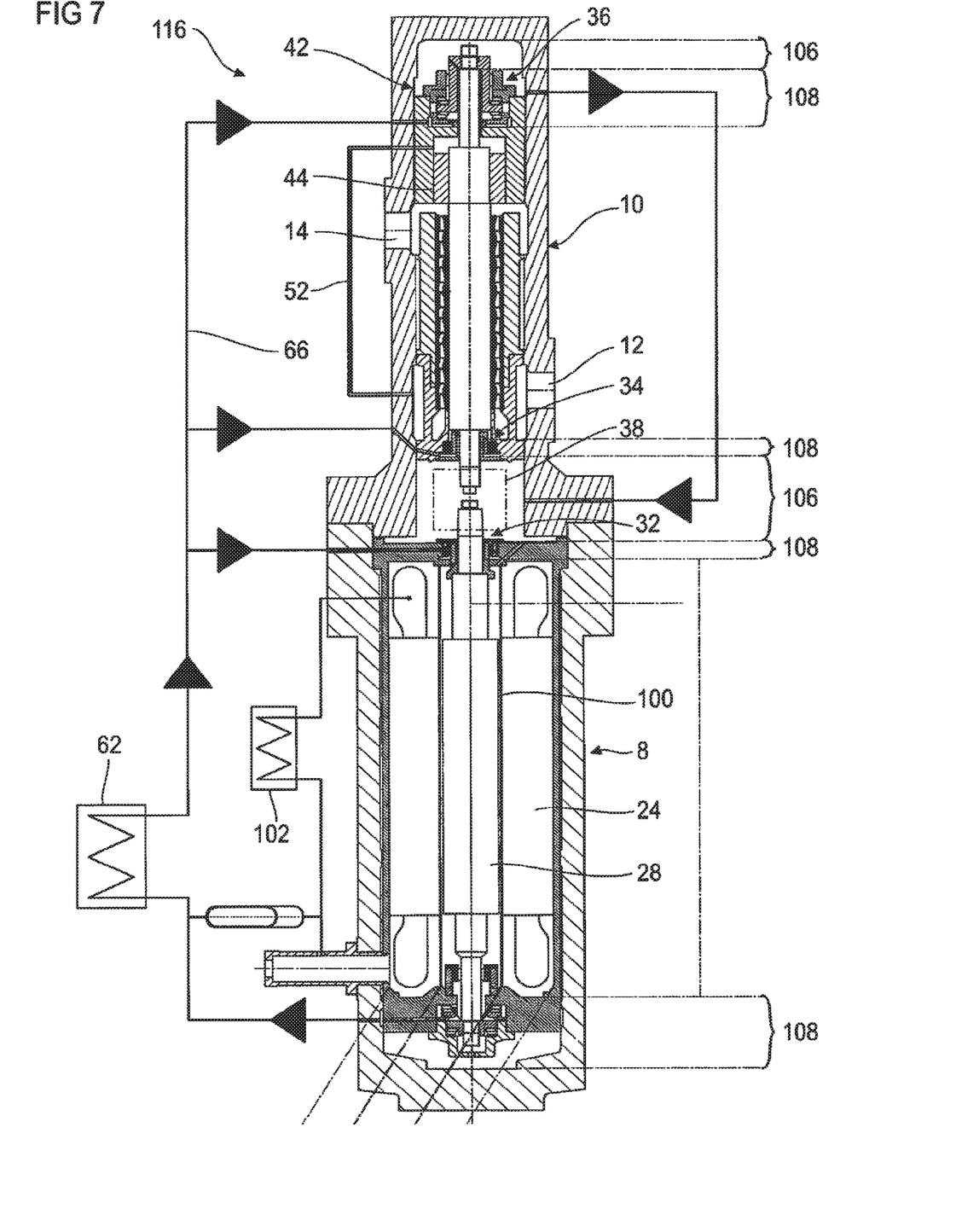
FIG. 7 is a further alternative multiphase pump with a downwardly disposed motor unit and an upwardly disposed pump unit.

In the embodiment of an alternative multiphase pump 116 shown in FIG. 7, the pump unit 10 is arranged upwardly and the motor unit 8 downwardly. A portion of the multiphase mixture is separated at the high-pressure side by the seal 44 and—as described with reference to the preceding embodiments—is separated in a first separation stage 42 so that the bearing 36 can be lubricated and cooled. In this embodiment, the liquid component is conducted downwardly into the motor unit 8 by gravity and thus reaches both the coupling 38 and the ring gap 100 between the rotor 28 and the stator 24. A particularly effective cooling of the motor unit 8 can hereby be achieved; however, associated with higher friction losses due to the substantially higher viscosity of the liquid component in comparison with the gas component. The liquid component collecting downwardly in the multiphase pump 116 is conducted upwardly again through the cooler 62 and to the bearings 36, 34, 32. In the second separation stages present with the bearings 32, 34, the liquid component and the gas component are separated and the gas component can cool the coupling 38 or is returned into the product inlet 12. The liquid component flows downwardly and repeatedly reaches the motor unit 8.

Figure 8:
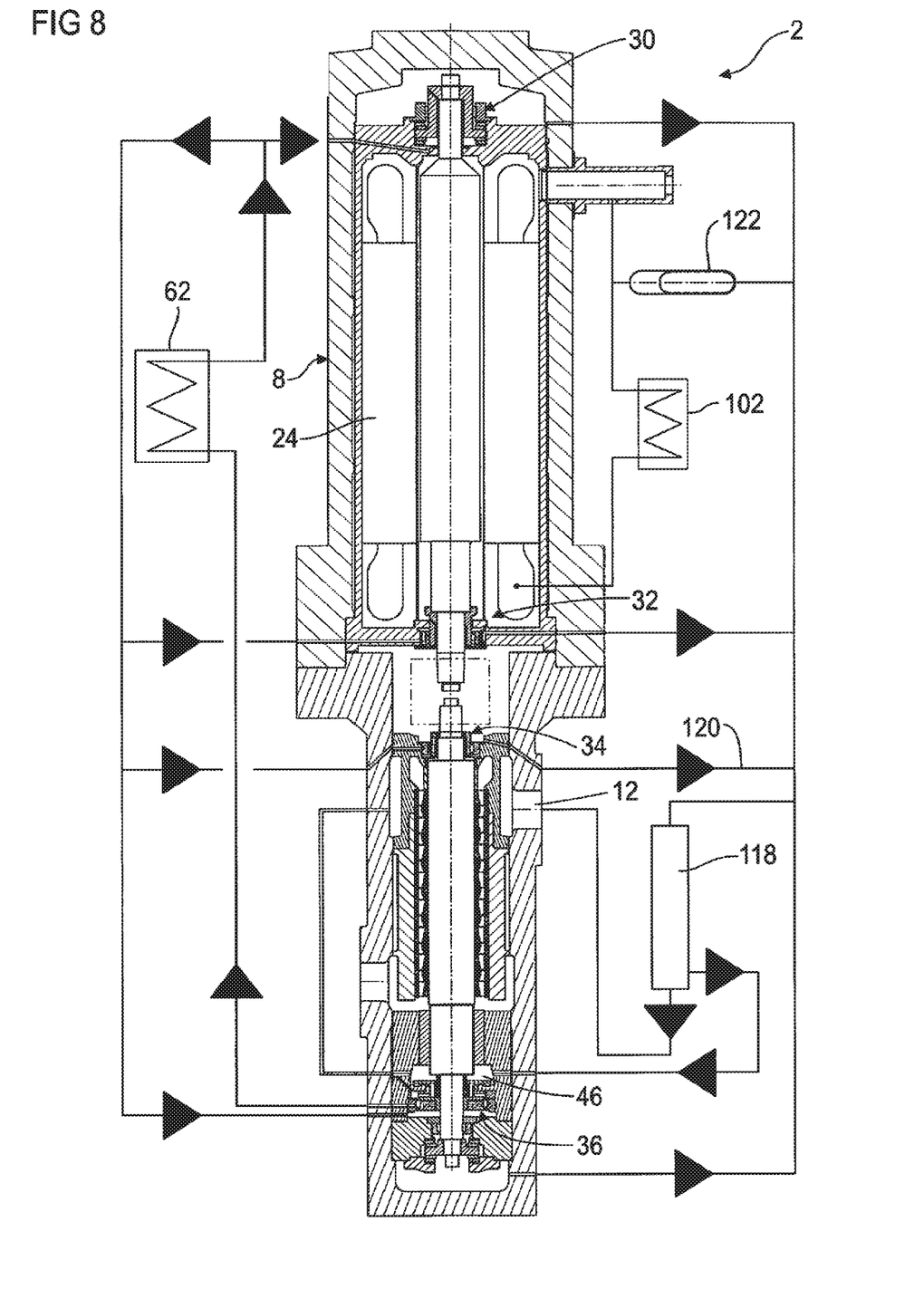
FIG. 8 is a multiphase pump analog to FIG. 1 with an additional further separation stage.

In the embodiment shown in FIG. 8, the multiphase pump 2 is the same as that of FIG. 1. In contrast to this, it has a further separation unit 118 in which the separated gas component is fed back into the product inlet 12. The purified liquid component is conducted into the low-pressure chamber 46. In addition, returned liquid component from the bearing 34 is not conducted through a removal passage 86 into the product inlet 12, but is also again supplied to the circuit via a return passage 120 in that it is conducted via the separation stage 118 and then into the low-pressure chamber 46. The liquid portion available can hereby be increased and can be designed clearer so that the lubrication and cooling can be carried out more effectively.

As can be seen from FIGS. 1, 5, 7 and 8, the dielectric liquid used for cooling the motor unit 8 is cooled via the cooler 102 and held in the circuit. The cooler 102 is arranged outside the pump housing and is dipped into seawater so that a removal of the introduced heat can take place effectively. The pressure within the stator 24 is matched to the pressure outside the stator 24 via a pressure compensation element 122. As an alternative cooling of the motor unit 8, the stator 24 can provide cooling passages by which the liquid-enriched liquid component is conducted from the multiphase mixture so that the separate circuit with the dielectric fluid can be dispensed with. The external circuit with the cooler 102 can be dispensed with since the total cooling runs over the cooler 62, that is both the liquid component and the cooling for the cooling of the stator and the cooling of the pump elements, such as the bearings 30, 32, 34, 36, is identical.

What is claimed:

1. A multiphase pump for pumping a multiphase mixture containing hydrocarbon, comprising:
   a separation system having a first separation stage configured to at least partly separate at least one portion of the multiphase mixture into a plurality of phase-enriched components, the first separating stage comprising an impeller attached to a pump shaft of the multiphase pump and having an inlet side formed by a seal; and
   a supply system configured to supply a liquid-enriched liquid component as a lubricant to a pump element to be lubricated,
   the first separation stage configured to enable the multiphase mixture to flow around and beneath the impeller, such that the liquid and solid from the multiphase mixture is capable of being driven radially outwardly to a collection chamber, a first portion of the liquid and solid being channeled to a product stream via a connection line and a second portion of the liquid and solid entering the supply system.

2. A multiphase pump in accordance with claim 1, wherein
   the separation system has a second separation stage configured to separate the liquid-enriched liquid component into a more highly enriched liquid component and a gas-enriched gas component.

3. A multiphase pump in accordance with claim 2, wherein
   the second separation stage is arranged upstream of the pump unit in the supply system.

4. A multiphase pump in accordance with claim 2, wherein
   the second separation stage has a centrifuge with a rotating centrifugal element with an inwardly disposed gas passage and an outwardly disposed liquid passage which leads through a bearing for supporting the centrifugal element.

5. A multiphase pump in accordance with claim 4, wherein
   a central shaft supports the centrifugal element.

6. A multiphase pump in accordance with claim 2, wherein
the supply system has a cooling unit between the first and second separation stages.

7. A multiphase pump in accordance with claim 1, wherein
the separation system includes a gas outlet configured to supply a gas to a heat producing pump element.

8. A multiphase pump in accordance with claim 7, wherein
the gas outlet is an outlet of a second separation stage configured to separate the liquid-enriched liquid component into a more highly enriched liquid component and a gas-enriched gas component.

9. A multiphase pump in accordance with claim 1, wherein
the separation system includes a gas outlet, and a cooling gas path extends from the gas outlet through a pump motor for a gas-enriched gas component for cooling the pump motor.

10. A multiphase pump in accordance with claim 1, further comprising
a gas circuit for a gas-enriched gas component of the separation system and a cooling unit in the gas circuit.

11. A multiphase pump in accordance with claim 1, wherein
the second portion of the liquid and solid includes only liquid.

12. A method of operating a multiphase pump, comprising:
pumping a multiphase mixture containing hydrocarbon, a portion of the multiphase mixture being supplied to a first separation stage of a separation system of the multiphase pump, the first separating stage comprising an impeller attached to a pump shaft of the multiphase pump and having an inlet side formed by a seal and the multiphase mixture flows around and beneath the impeller; and
separating, using the separation system, the multiphase mixture into at least one liquid-enriched liquid component and one gas-enriched gas component and the liquid-enriched liquid component being driven radially outwardly to a collection chamber, a first portion of the liquid-enriched liquid component being channeled to a product stream via a connection line and a second portion of the liquid-enriched liquid component entering the supply system to be used at least for lubricating a pump element.

13. A method in accordance with claim 12, wherein
a solid portion of the multiphase mixture is separated in the first separation stage and the liquid-enriched liquid component is used free of solid portions for lubrication.

14. A method in accordance with claim 12, wherein
a pump unit or a motor unit of the multiphase pump is divided into at least one liquid-cooled region and at least one gas-cooled region and supplying the liquid-enriched liquid component to the liquid-cooled region and supplying the gas-enriched gas component to the gas-cooled region.

15. A method in accordance with claim 12, further comprising
separating the liquid component in a second separation stage of the separation system into a more highly enriched liquid component and a gas-enriched gas component and the more highly enriched liquid component cools a pump element.

16. A method in accordance with claim 1, further comprising
conducting the liquid component and the gas component, after the separation, into a common space from which the liquid component is conducted away downwardly and the gas component is conducted away upwardly.

* * * * *